May 5, 1964   R. R. E. NILSSON   3,131,859
INDICATOR
Filed July 5, 1960   2 Sheets-Sheet 1

May 5, 1964  R. R. E. NILSSON  3,131,859
INDICATOR
Filed July 5, 1960  2 Sheets-Sheet 2

United States Patent Office 3,131,859
Patented May 5, 1964

3,131,859
INDICATOR
Ronald Raymond Eric Nilsson, 4 Rue de Babylone,
Paris 7, France
Filed July 5, 1960, Ser. No. 40,782
4 Claims. (Cl. 235—76)

The present invention relates to parking or hiring period indicators and the like, and more particularly to indicators of the type affording a limited total parking or hiring time and permitting this total time to be utilized as desired.

There are known parking period indicators which are put on display in the parked vehicle and are adapted to indicate the time of arrival of the vehicle in the selected parking place and the departure time or time at which the vehicle must leave this parking place according to the parking regulation prevailing in that area. Failure to move the vehicle by the departure time indicated by the indicator exposes the vehicle user to a fine notified to him by a fine ticket placed on the vehicle by a policeman or other parking surveillance agent. Use of such an indicator is compulsory in the regulated parking zone.

The aforementioned system, in actual use in Paris, France, has the advantage that all users are allowed to park in the regulated zone on condition that the allowed parking period is not exceeded.

However, a drawback of the system is that it is open to abuse in that it is sufficient to shift the vehicle at the end of each allowed parking period to benefit from a further parking period in the regulated parking zone, this procedure being repeated so long as it is required to park in the regulated zone. This tends to defeat the purpose of the system, namely to restrict the number of circulating or stationary vehicles in the regulated zone and yet permit all vehicle users to park their vehicles for a limited period.

Another drawback of the aforementioned system is its lack of flexibility, in that the allowed parking period is inconveniently short and is applicable to all users alike irrespective of the advantage each user takes of the allowed parking period.

The object of the present invention is to provide a parking or hiring time system and indicator which possess the advantages of the known systems and yet none of the aforementioned drawbacks.

The parking or hiring time indicator of the invention provides the user with a given total of available parking time which can be used or "drawn from" in any way the user wishes. Further, the system of the invention is not related to the actual parking place of the vehicle, and is therefore not open to the aforementioned abuse. The system of the invention is fair to all users in that each user is provided with a given total available parking time to be utilized or drawn from within a given period.

In a modification of the system of the invention, the indicator could be so adapted as to allow a free or authorized parking period of limited duration for each setting of the means indicating the start of the parking period, said total available parking time being drawn from only for that part of the selected parking period in excess of said free parking period.

The indicator according to the invention comprises start indicating means for indicating the time at which the selected parking or hiring period starts, parking duration indicating means for indicating the duration of the selected parking period, a totalizer for totalizing the number of time units, such as hours, of the selected parking period and actuated by the parking duration indicating means, and stop means for automatically stopping operation of the indicator when a given number of parking time units have been totalized by the totalizer.

In various possible more specific embodiments, the indicator according to the invention possesses one or more, or combinations, of the following further features:

(a) Said parking duration indicating means consists in limit indicating means indicating the time at which the selected parking period ends, the parking duration being derived from subtracting the time indicated by said start indicating means from that of the limit indicating means.

(b) The limit indicating means actuates the totalizer only after the limit indicating means is set beyond the point where the time it indicates is later than that indicated by the start indicating means.

(c) In a modification of the invention, the limit indicating means actuates the totalizer only after time indicated by the limit indicating means is later than that indicated by the start indicating means by an amount corresponding to a limited period of free non-totalized parking, for example two hours.

(d) The start and limit indicating means are operatively interconnected so that in setting the start indicating means the latter automatically sets the limit indicating means at the same time indication, the setting of the limit indicating means being thereafter completed by acting directly thereon to indicate the time at which the selected parking period ends.

(e) The totalizer indicates the total available parking time left after each individual selected parking period.

(f) The start and limit indicating means are in the form of rotative discs carrying time units visible in turn behind windows provided in the case of the indicator.

(g) The discs are rotative in one direction only corresponding to increasingly later values of the time indicated.

(h) The totalizer is in the from of a disc carrying units of time ranging from "0" to a number corresponding to the total number of available time units, for example 60 hours, these units being visible in turn behind a window provided in the case of the indicator.

(i) The indicator is intended to be used over a period of a plurality of days, for example one month, and further comprises date indicating means, the arrangement being such that changing the date indicated by the date indicating means automatically ensures that the parking duration indicating means is re-set to zero.

(j) The date indicating means is locked in position by locking means, the latter being released only when the parking duration indicating means is re-set to zero, the setting of the latter to a new parking duration indication automatically bringing the locking means once more into action.

(k) The locking means comprises a locking member connected to the start indicating means and adapted to engage and lock a disc connected to the date indicating means except in the position of the start indicating means corresponding to a zero indication.

(l) The stop means is retractable when operation of the indicator has been stopped thereby to enable a further allowed total parking period to be utilized or drawn from, sealing means being provided to ensure that this stop means is only retractable by the authorities issuing the indicator to the user.

(m) In the case of parking periods which are charged for, said stop means could be retracted by the insertion of a coin (or other authorized element) in the case of the indicator.

(n) Indelible identification markings are provided on the indicator, such as the same number as that on the number plate of the vehicle, to ensure that each vehicle only displays its authorized indicators.

Further features and advantages of the invention will be apparent from the ensuing description, with reference to the accompanying drawing, of one embodiment to which the scope of the invention is in no way limited.

This embodiment relates to a selected parking period indicator, but it must be understood that the indicator could be used for other purposes, such as, for example, hiring period control purposes.

Figure 1:
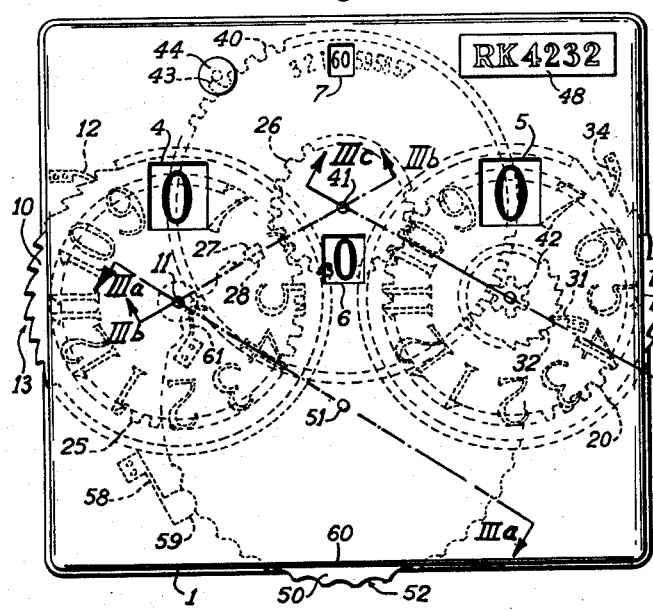
FIG. 1 is a front elevational view, partly in section through the stop means abutment, of the indicator according to the invention.
Figure 4:
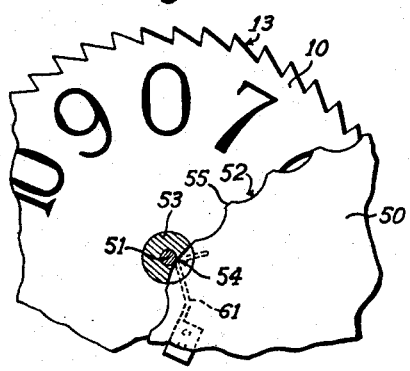
Figure 3A:
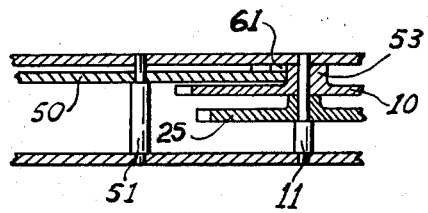
FIG. 3a is a partial sectional view taken along line IIIa—IIIc in FIG. 1, the discs and gears having been thickened and separated from one another on their axis to render the drawing more clear.
Figure 3B:
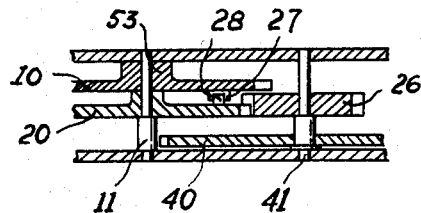
Figure 3C:
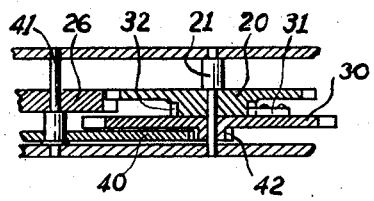

FIG. 3b' is a partial sectional view taken along line IIIb—IIIb in FIG. 1, the discs and gears having been thickened and separated from one another on their axis to render the drawing more clear;

FIG. 3c is a partial sectional view taken along line IIIc—IIIc in FIG. 1, the discs and gears having been thickened and separated from one another on their axis to render the drawing more clear;

FIG. 4 is an enlarged partial view of the starting indicating means, and

Figure 5:
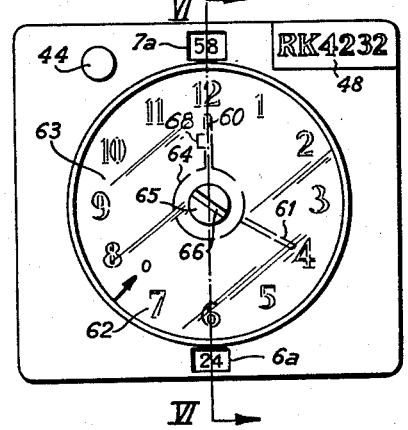

FIG. 5 is a front elevational view of a second indicator according to the invention.

Figure 6:
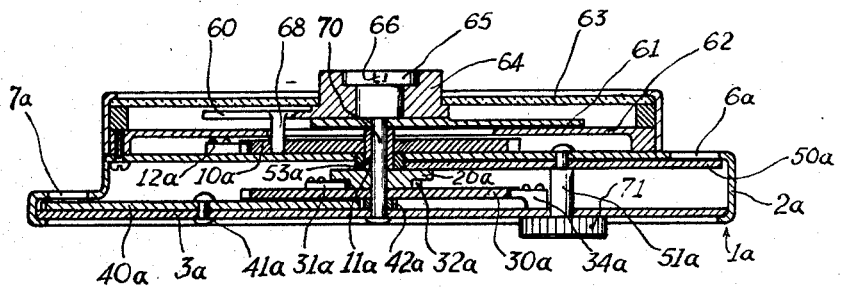

FIG. 6 is a sectional view taken along line VI—VI of FIG. 5.

In the embodiment shown in FIG. 1 the indicator comprises a case generally designated by the reference numeral 1 and consisting, for example, of two metal panels 2 and 3 welded together along their peripheries.

The front panel 2 is dished in order to receive the indicator mechanism and is provided with four windows 4, 5, 6 and 7 which are preferably provided with panels of transparent plastic or glass.

Displayed in the window 4 is the hour at which parking commences, and in the window 5 the selected hour of departure, both of which are set by the user. The date, or at least the day of the month, is indicated in window 6 and the total number of parking hours at the disposal of the user is indicated in window 7.

The mechanism whereby the desired indications are displayed in these windows will now be described.

The hours of arrival are set by start indicating means comprising, in the presently-described embodiment, a disc 10 which is rotatably mounted between the panels 2 and 3 by means of a spindle 11 journalled in the case 1. For example, the disc 10 carries, as shown in FIGS. 3 and 4, twelve numbers, 0, 9, 10; 11, 12, 1, 2, 3, 4, 5, 6, 7, any one of which corresponds to the start of the parking period. These numbers are so arranged as to appear in the window 4 in succession as the disc 10 is rotated, for example, in a clockwise direction. A pawl 12, for example in the form of a spring member fixed to the panel 2 and engaging ratchet teeth 13 on the disc, prevents a counterclockwise rotation of the latter.

The disc 10 partially extends out of the case 1 through an aperture 15 in the panel 2.

The hours of departure are indicated in the window 5 by limit indicating means comprising, in the presently-described embodiment, a second disc 20 carrying, for example, twelve numbers 0, 9, 10, 11, 12, 1, 2, 3, 4, 5; 6, 7, so arranged as to appear in the window 5 in succession as the disc 20 is rotated in the clockwise direction. The disc 20 is rotatably mounted within the case 1 by means of a spindle 21 journalled in the latter, on which spindle the disc 20 is freely rotative.

The discs 10 and 20 are operatively interconnected by connecting means so adapted that the disc 10 is capable of rotating the disc 20 in the clockwise direction only when identical hours are indicated in both windows 4 and 5.

These connecting means will now be described.

Freely rotative on the spindle 11 is a gear 25 which meshes with gear teeth formed on the disc 20 through the medium of an idler gear 26 rotatably mounted in the case 1. The gear 25 and the disc 20 have an equal number of teeth.

An abutment 27 provided on the disc 10 is adapted to bear, in the clockwise direction relative to the spindle 11, against an abutment 28 provided on the gear 25 when identical hours are indicated by the discs 10 and 20 in the windows 4 and 5.

Thus, upon rotation of the disc 10 from outside the case 1 the disc 20 is rotated in the same direction as soon as the abutment 27 encounters the abutment 28 and not before.

Parking duration selecting means are provided for rotating the disc 20 independently of the disc 10 and thereby indicating in the window 5 the selected departure hour.

These selecting means comprise, for example, a disc 30 freely rotative on the spindle 21 and operatively connected to the disc 20 by a unidirectional connection or freewheel device comprising, for example, a pawl 31 in the form of a spring member fixed to the disc 30 and engaging a ratchet wheel 32 rigid with the disc 20, the arrangement being such that the disc 30 is only capable of rotating the disc 20 in the clockwise direction. The disc 30 extends out of the case 1 through an aperture 33 in the panel 2 and is prevented from rotating in the counterclockwise direction by a pawl 34, for example in the form of a spring member fixed to the case 1, and ratchet teeth 35 formed on the periphery of the disc 30.

In order to limit the total available parking time, a parking time totalizer and automatic stop means are incorporated in the indicator.

The parking time totalizer comprises, for example, a gear 40 which is rotatably mounted in the case 1 by a spindle 41 and is meshed with a gear 42 coaxial and rigid with the disc 30.

Said automatic stop means comprises, for example, a lug 43 rigid with the gear 40 and adapted to encounter, in the course of the rotation of the latter, an abutment 44 fixed to the case 1.

Preferably, the gear 40 carries hour graduations adapted to appear in the window 7 so as to indicate the number of hours available to the user of the indicator. Thus the number corresponding to the total number of available parking hours appears in the window 7 when the lug 43 rests against one side of the abutment 44 at the start of the rotation of the gear 40 and the number "0" appears in the window 7 when the gear 40 has effected its allowed rotation and the lug 43 rests against the other side of the abutment 44.

It will be understood that the total number of parking hours depends on the gear ratio between the gears 40 and 42, and the total rotation of the gear 40 permitted by said stop means. For example, if a single abutment 44 is used and this gear ratio is 1:5 and the disc 20 carries twelve hour divisions, a total number of substantially sixty parking hours are available before the lug 43 encounters the abutment 44 and the number "0" appears in the window 7.

The indicator of the invention, as just described, operates in the following manner:

Let it be assumed that the total available parking time allowed by the parking time totalizer and stop means (40–44) is only six hours and that the windows 4 and 5 indicate "0."

If the user wishes to park his car between, say, 10 and 2 o'clock in the afternoon, he first rotates the disc 10 until the number "10" appears in the window 4. This of course indicates that his time of arrival in the regulated parking area is 10 o'clock. But in rotating the disc 10 the contacting abutments 27 and 28 also caused the disc 20 to rotate to the same extent so that the number "10" also appears in the window 5. In order to indicate the number "2" in the window 5, corresponding to the hour of departure, the user rotates the disc 30 until the number "2" appears and the indicator is set correctly.

Rotation of the disc 30 causes the totalizing disc 40 to rotate to the extent of four of its hour divisions and the number "2" appears in the window 7, indicating that there are only two more parking hours available before the indicator is automatically rendered inoperative by the stop means.

Further rotation of the disc 20 occurs without rotation of the disc 10, since the abutment 28 merely freely rotates round the spindle 11 and leaves the abutment 27 which remains stationary.

Assuming now that the user wishes to park his car for a second period between, say 3 and 4 o'clock, he first rotates the disc 10 until the number "3" appears in the window 4 and then rotates the disc 20 until the disc 20 indicates the number "4" in the window 5.

It will be observed that in the course of the rotation of the disc 10 until the number "3" appears in the window 4 the abutment 27 once more encounters the abutment 28 so that a number "3" is automatically indicated in the window 5. But as the user wishes to park for one hour until 4 o'clock, he has to rotate the disc 30 until the number "4" appears in the window 5 and this necessarily rotates the gear 40 through one or more hour division so that the window 7 will now show the number "1," indicating that only one more hour is available for a further parking period.

Thus, should the user desire to avail himself of a further two hours parking, say 5 to 7 o'clock, and he once more rotates the disc 10 until the number "5" appears in the windows 4 and 5, he is only able to subsequently rotate the disc 30 until the number "6" appears in the window 5, corresponding to a further parking period of only one hour, since the lug 43 encounters the abutment 44 at this moment and prevents further rotation of the disc 30.

Thenceforth the indicator is of no more use and must be returned to the parking or hiring authorities so that they may remove the abutment 44, shift the lug 43 to the other side of the abutment by turning the disc 30 and replace the abutment 44 and thereby permit a further rotation of the totalizer gear 40 until the lug 43 again encounters the abutment 44.

If the indicator is intended to be of use during a plurality of days, the indicator must be completed by an arrangement which prevents the user from setting the indicator for a given parking period and thereafter displaying the indicator with this setting in his vehicle each day without rotating the disc 30, that is, without actuating the totalizer. This arrangement comprises, for example, date indicating means combined with locking means which ensure that each change in the date indication is automatically associated with a re-setting to zero of any selected parking period which might be indicated on the indicator.

In the presently-described embodiment, the date indicating means comprises (see FIGS. 1, 3 and 4) a disc 50 rotatably mounted in the case 1 by a spindle 51 and carrying thirty-one numbers "1" . . . "31" which correspond to the days of a thirty-one day month and are adapted to appear in the window 6. The disc 50 comprises thirty-one notches 52 which correspond to the thirty-one numbers and are each adapted to fit partially round a cylindrical flange 53 rigid with the spindle 11 which is rigid with the disc 10 (FIG. 4). The flange 53 is cut away at 54 in such manner that when the number "0" appears in the window 4 (see FIG. 4), this cut-away face 54 clears the periphery 55 of the disc 50 and the latter is free to rotate. On the other hand, when the disc 10 is in any other angular position, the part-cylindrical portion of the flange 53 extends into one of the notches 52 and locks the disc 50 in position. The notches 52 are so disposed that a date indication is correctly positioned in the window 6 for each engagement between a notch and the part-cylindrical portion of the flange 53. Preferably, a spring member 58 fixed to the case 1 is provided to yieldably engage each notch 52 as the disc 50 is rotated so as to hold the latter in correct position for indicating a date in the window 6. Exertion of sufficient rotational force on the disc 50 causes the nose 59 of the member 58 to ride up the curved wall of each notch 52 and allow passage of the periphery 55. The disc 50 partially extends out of the case 1 through an aperture 60 in the panel 2. Preferably, a spring strip 61, one end of which is fixed to the case 1, is so arranged as to bear against the flange 53 and engage the cut-away face 54 when the number "0" appears in the window 4 so as to tend to hold the disc 10 in this position during adjustment of the date disc 50.

Thus, it will be clear from the foregoing that each time it is desired to indicate a new date in the window 6, it is necessary to unlock the disc 50 by first, rotating the disc 10 until the numeral "0" appears in the window 4. As explained hereinbefore, the contacting abutments 27 and 28 also cause the same numeral "0" to be displayed in the window 5. When the disc 50 is thus unlocked, it is rotated until the desired date indication appears in the window 6, and the indicator is once more ready to be used in the manner described hereinbefore, subsequent rotation of the disc 10 automatically locking the disc 50 in position by the engagement of the part-cylindrical portion of the flange 53 in the corresponding notch 52.

The indicator including the date indicating means just described will thus ensure that use of the indicator on more than one occasion in each month necessarily involves resetting the indications in windows 4 and 5 to zero and a subsequent rotation of the disc 30 and the totalizer gear 40 for each new selected parking period. It is nevertheless still possible to use the indicator for a selected parking period once in each month without need to rotate the disc 30 and the totalizer gear 40; for example, if the indicator is set at a parking period of, say, 10 hours on the 12th day of the month, it would be possible to avail oneself of a ten hour parking on the 12th day of each successive month without need to rotate the disc 30. However, this is hardly likely to be indulged in, since it entails keeping the vehicle permanently outside the regulated parking zone except for one day in each month. It might be mentioned here, that if the disc 50 carried instead of numbers ranging from, say "0" to "9" corresponding to the last digit of the days of the month, the indicator could be used once every ten days with the same selected parking period without need to rotate the disc 30 and the totalizer gear 40. Here again, this entails keeping the vehicle out of the regulated parking zone nine days out of ten. The absence of the vehicle from the regulated parking zone for nine consecutive days is highly desirable from the traffic restriction point of view, and the "free" parking thus obtained every ten days would tend to encourage users to adopt this practice.

It will be observed that in the embodiment shown in FIG. 1 in which the disc 50 has thirty-one date numbers, the digits representing the units of the numbers in the window 6 are much larger than the digits representing the tens. This is to render the date indication more visible. To distinguish from a distance the difference between, say "11," "21" and "31" when only the last digit of these numbers is clearly visible, it is advantageous to utilize a different colour for each of these digits, for example, on the disc 50, the numbers ranging from "1" to "10" could be blue, those from "11" to "20" red, and those from "21" to "31" green.

Figure 2:
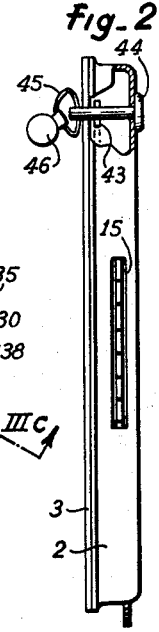
FIG. 2 is a side elevational view thereof.

It is obvious that the indicator must be completely sealed and tamper-proof so that it is impossible to interfere with the proper operation of the mechanism and particularly that actuating the totalizer. Furthermore, the abutment 44, forming part of the automatic stop means must be so fixed in the indicator as to be impossible to withdraw without unmistakable signs of tampering. In the embodiment shown in FIGS. 1 and 2, the abutment 44 is shown to be a stud which extends through the case 1 and is held therein by a wire 45 which extends through the end of the stud and whose ends are held together by a seal 46. The latter is broken by the authorities when withdrawing the abutment 44 to allow the totalizer gear 40 to effect a further complete totalizing travel. This seal must of course be unbroken each time the indicator is returned to the parking or hiring authorities.

The registration number of the vehicle is also preferably indelibly marked on the case 1 so as to ensure that only one indicator is used on each vehicle, issue of these indicators being under the control of the parking authorities. This registration number, such as the registration number 48, could be permanently stamped in the metal of the panel 2. To facilitate checking correspondance between the number on the indicator and that on the registration plate of the vehicle, police regulations could insist that the vehicle registration number be etched or otherwise permanently marked on the vehicle windscreen adjacent the indicator.

Means could be provided for securing the indicator to the windscreen of the vehicle, for example rubber suckers could be attached to the case 1, these suckers being pressed against the windscreen.

Although specific embodiment of the invention has been described, the scope of the invention is not intended to be limited to this embodiment, which has been given merely by way of example.

Thus the discs 10, 20 and 30 could be coaxial, the disc 10 being, for example, in the form of a ring having an outside diameter larger than that of the disc 20 and rotatably mounted on the periphery of the latter so that each of the two discs is capable of displaying its numbers in windows in the case 1. In this arrangement the gear 25 shown in FIG. 3 could constitute the disc 20, this gear being enlarged and carrying the parking limit indication numbers. The ratchet wheel 32 would be rigid and coaxial with the gear 25 and the disc 30 would be rotatably mounted on the spindle 11 under the gear 25, the pawl 31 secured to the disc 30 engaging the ratchet wheel 32 in the above-described manner. The gear 42 rigid with the disc 30 would still be meshed with the totalizer gear 40. The pawl 34 still engages the ratchet teeth 35 on the disc 30 in the above-described manner. The date indicating disc 50, which is still operatively connected to the disc 10 in the above-described manner, is advantageously placed on top of the disc 10, as viewed in FIG. 3, thereby enabling the gear 42 to be extended in the form of a spigot which is rotatably mounted in the panel 3 and secured to an external control knob controlling the limit indicating means, that is the discs 30 and 20. The disc 10 could extend through the aperture 15 in the case 1 for setting the start indications in the above-described manner. Likewise, the disc 50 could also extend through the aperture 60. In this modification, the elements 20 and 26 are thus dispensed with. It will be clear that window 5 must be repositioned in the case to display the time limit hours.

FIGS. 5 and 6 show a modification of the invention in which the start and limit indicating means are in the form of clock hands 60 and 61 respectively, which are mounted for rotation about a common axis in front of a clock dial 62. The component elements of the embodiment shown in FIGS. 5 and 6 which are similar to elements of the embodiment shown in FIGS. 1–4, at least as concerns their function and co-operation with associated elements, carry the same reference numeral to which is added the letter "a."

This embodiment is particularly suitable for the coaxial arrangement of the discs 10 and 20 (constituted by the gear 25) just described. In the presently described modification the disc 10a is connected to the hand 60 and the disc 20a is connected to the hand 61. In this modification a central spindle 70 is rotatively mounted in the panel 3a of the case 1a and carries, rotative on this spindle, an outer knob 64 which is rigid with the hand 60. The hand 61, a sleeve 11a and the disc 20a are welded together or otherwise keyed together as concerns rotation and are rotatively mounted on the spindle 70. Rigid with the lower part of the spindle 70 is a disc 30a and a gear 42a. The latter is meshed with a totalizing disc 40c. The disc 10a and an element 53a are rigid with one another as concerns rotation and are rotatively mounted on the sleeve 11a. The element 53a co-operates with a date-changing disc 50a. The latter is rigid with a spindle 51a which is secured to an outer control knob 71 through the medium of which the disc 50a is rotated for changing the date indication. The disc 10a is connected to the hand 60 by a depending abutment tab 68 which is engaged in the disc 10a and also serves to rotate the other hand 61 when the hour indications of the two hands are identical or staggered by a period of time corresponding to the aforementioned "free" or authorized parking period for which the available parking time is not drawn from. The spindle 70 has an enlarged head 65 in which is provided a slot 66 for the purpose of rotating this spindle, for example by means of a coin.

As mentioned hereinbefore, all the elements carrying the letter "a" are similar to the elements having the same reference numeral in the first embodiment, at least as concerns their function. Likewise, these elements co-operate with pawls 12a, 31a, 34a and the disc 50a co-operates with a spring member 58a (not shown), the element 53a co-operates with a spring strip 61a (not shown) and the totalizing disc 40a co-operates with a locking pin 44 in the manner described hereinbefore. However, no lugs 27 and 28 are needed as the tab 68 and hand 61 perform their function, this tab 68 moving in a large central opening in the dial 62. Preferably, the hands 60, 61 and dial 62 are protected by a glass or transparent plastic window 63 secured to the dial 62 by any suitable arrangement.

Windows 6a and 7a could be provided in the case 1 with the associated mechanism, to indicate the date and the number of available parking hours, in the manner described hereinbefore. The sealed abutment 44 and the registration number 48 are also provided.

The zero-setting position of the start indicating hand 60 could be arranged to be that in line with a point half way between 7 and 8 o'clock, since this division of the clock dial is not used as at this hour there is usually no need to regulate the parking. Thus, to change the date, the hand 60 must first be rotated to the position in which it is in line with the point half way between 7 and 8 o'clock, after which the date indicating means can be set in the manner described hereinbefore.

It will be clear from the foregoing that, in using the indicator, the hand 60 is merely set to the hour of arrival by acting on the knob 64 and the hand 61 set to the selected hour of departure by acting on the head 65.

The abutment tab 68 can be adapted to encounter and bear against the hand 61 in the clockwise direction when the hour indications of the two hands are identical or separated by a period of time corresponding to the aforementioned "free" or authorized parking period for which the available parking time is not drawn from.

The date indicating means described hereinbefore could be combined with the start indicating means to ensure that the latter is set to zero when changing the date in a different manner to that described. For example, the disc 50 could be meshed with a gear coaxial with the disc 10 and connected to the latter by a limited torque transmitting slip clutch, and means similar to the nose 59 could be provided to engage in a recess in the disc 10 when the latter indicates "0" in the window 4. Thus, by making the gear ratio between the disc 50 and the gear, connected to the disc 10 by the clutch, high enough, rotation of the disc 50 from one date indication to the next could be made to cause said gear to effect one complete rotation which, through the medium of the clutch, causes the disc 10 to rotate until it reaches its zero position whereupon the nose engages the recess and the additional torque resistance created by this engagement causes the clutch to slip for the rest of said complete rotation.

In this automatic re-setting arrangement, in order to prevent the user from stopping the disc 10 from being thus rotated to its zero position, by holding the disc control means (such as the external control knob or the external periphery of the disc 10) stationary, this control means must be operatively connected to the disc 10 by a free wheel device in such manner that the control means can only rotate the disc 10 in the clockwise direction and freewheels in the other direction. Alternatively, the disc 50 could be meshed to a gear coaxial and yieldingly connected with the gear 25 so that it is the disc 20 which is reset to zero, the aforementioned nose and recess arrangement for holding the disc in the zero position being in this case associated with the disc 20 instead of the disc 10.

In the foregoing description of the various embodiments, the start and limit indicating means indicated hour units. However, these units could be other than hours, such as days, depending on the use to which the indicator is put. The number of divisions on these indicating means could be other than those described. The date indicating means could be adapted to indicate both the day of the month and the month of the year.

In the interests of simplicity, the totalizer has been described as a simple gear 40; it will be obvious that if the totalizer is intended to totalize a large number of time units, such as 150 hours, it would be preferably in the form of a gear train, said stop member 44 acting on the slowest moving gear of this train.

In FIG. 1, the discs 10, 20 and 50 are rotated by acting on their peripheries extending out of the case 1; if desired these discs could be rotated by wheels or knobs which are located on the rear panel 3 of the indicator and are rigidly or operatively connected to these discs.

The case 1 and the various elements of the indicator mechanism can be made of any suitable material, such as metal or plastic material.

The discs 40 and 50 could be rotatably mounted on the same spindle 41, the disc 40 in this case preferably displaying the available parking time through a window provided in the rear panel 3.

In a modification of the embodiment shown in FIG. 5, the hands 60 and 61 are replaced by two coloured narrow radial lines on the coaxial disc 10 and gear 25 (constituting the disc 20) respectively, which rotate behind the dial 62. The latter is provided with twelve narrow radial slots corresponding to the twelve hours of the day. Thus the start and limit indications are obtained by rotating the disc 10 and the gear 25 until their respective radial lines appear in the radial slots corresponding to the start and limit hours.

Having now described my invention what I claim as new and desire to secure by Letters Patent is:

1. Parking or hiring period indicator comprising a case, start indicating means enclosed in the case for indicating the hour at which the selected parking period starts, first setting means combined with the start indicating means and accessible from outside the case for setting the hour at which the selected parking period starts, limit indicating means enclosed in the case for indicating the hour at which the selected parking period ends, second setting means combined with the limit indicating means and accessible from outside the case for setting the hour at which the selected parking period ends, a unidirectional drive connection operatively interconnecting the start indicating means and the limit indicating means so that in setting the start indicating means the latter automatically sets the limit indicating means at the same hour indication, the setting of the limit indicating means being thereafter completed by acting thereon directly by means of the second setting means to indicate the time at which the selected parking period ends, a totalizer and a drive connection between the second setting means and the totalizer so that the latter totalizes each setting effected by the second setting means, and stop means in the case adapted to prevent use of the indicator and associated with the totalizer so as to stop further rotation of the totalizer when the totalizer has totalized a predetermined total of said settings of the second setting means.

2. Indicator as claimed in claim 1, wherein each indicating means comprises a rotative disc having thereon numbers corresponding to hours of the day from which the parking period is to be selected and an index in the form of a window provided in the case through which the selected hour is visible, said unidirectional drive interconnecting the discs and comprising two abutments which abut one another when the hour indication of both indicating means are identical, and said discs are rotative in one direction only corresponding to increasingly later hours indicated.

3. Indicator as claimed in claim 2, and intended to be used over a period of a plurality of days, said indicator further comprising a third disc rotative in the case and having thereon numbers corresponding to the days of the month and a window in the case through which the day is visible, the disc of the start indicating means including a zero setting in which the third disc is allowed to rotate by a locking member associated with the disc of the start indicating means for indicating the day of the month whereas in all other positions of the disc of the start indicating means said locking member prevents rotation of the third disc whereby the setting of the day of the month must be preceded by a setting of zero of the start indicating means.

4. Indicator as claimed in claim 1, wherein the stop means is retractable from the case when operation of the indicator has been stopped thereby so as to enable the totalizer to rotate and to totalize further parking periods, sealing means being provided to insure that the stop means is not withdrawn by the user but by the authorities issuing the indicator.

References Cited in the file of this patent
UNITED STATES PATENTS

| | | |
|---|---|---|
| 2,804,265 | Wilson et al. | Aug. 27, 1957 |
| 2,870,735 | Hunt | Jan. 27, 1959 |